US008613603B2

(12) United States Patent
Cooke

(10) Patent No.: US 8,613,603 B2
(45) Date of Patent: Dec. 24, 2013

(54) ARMATURE FOR A SOLENOID ACTUATOR

(75) Inventor: Michael Peter Cooke, Gillingham (GB)

(73) Assignee: Delphi International Operations Luxembourg, S.A.R.L., Luxembourg (LU)

( * ) Notice: Subject to any disclaimer, the term of this patent is extended or adjusted under 35 U.S.C. 154(b) by 265 days.

(21) Appl. No.: 12/909,047

(22) Filed: Oct. 21, 2010

(65) Prior Publication Data

US 2011/0110804 A1 May 12, 2011

(30) Foreign Application Priority Data

Nov. 12, 2009 (EP) .................................... 09175837

(51) Int. Cl.

| | |
|---|---|
| ***F04B 17/04*** | (2006.01) |
| ***F01B 31/00*** | (2006.01) |
| ***H02K 33/06*** | (2006.01) |
| ***H01F 3/00*** | (2006.01) |
| ***H01F 7/08*** | (2006.01) |

(52) U.S. Cl.
USPC .............. 417/417; 92/130 C; 310/23; 310/30; 335/261; 335/279

(58) Field of Classification Search
USPC ................ 417/416, 417, 418, 505; 92/130 C, 92/130 R; 310/23, 24, 30, 15, 17, 20, 28; 335/261, 279; 251/129.16, 129.21, 251/129.22
See application file for complete search history.

(56) References Cited

U.S. PATENT DOCUMENTS

| | | | | |
|---|---|---|---|---|
| 2,491,905 | A * | 12/1949 | Ray | 62/524 |
| 5,572,922 | A * | 11/1996 | Moon | 92/181 P |
| 5,743,238 | A | 4/1998 | Shorey et al. | |
| 7,383,819 | B1 | 6/2008 | Ogawa et al. | |
| 2001/0033214 | A1 | 10/2001 | Bircann et al. | |
| 2008/0014103 | A1 | 1/2008 | Cooke | |

FOREIGN PATENT DOCUMENTS

| | | |
|---|---|---|
| EP | 1555433 | 7/2005 |
| EP | 1878920 | 1/2008 |
| GB | 1102555 | 7/1968 |
| JP | 57-196273 | 12/1982 |
| JP | 8-135579 | 5/1996 |
| JP | 9-96285 | 4/1997 |

OTHER PUBLICATIONS

European Search Report dated Jan. 18, 2010.
Japan Office Action dated Mar. 3, 2011.
China Office Action dated Jun. 5, 2012.

* cited by examiner

*Primary Examiner* — Bryan Lettman
(74) *Attorney, Agent, or Firm* — Mark H. Svoboda

(57) ABSTRACT

An armature for a solenoid actuator is disclosed. The armature comprises a first face comprising a recess suitable for receiving a biasing spring in use of the armature; a second face opposite the first face; and fluid communication passages for providing a fluid flow path through the armature between the recess and the second face in use of the armature. The first face is uninterrupted by the fluid communication passages. The invention reduces the risk of cavitation damage during operation of the actuator. In one application, the actuator is used in a fluid pump for a selective catalytic reduction system.

16 Claims, 6 Drawing Sheets

ARMATURE FOR A SOLENOID ACTUATOR

FIELD OF THE INVENTION

The present invention relates to an armature suitable for use in a solenoid actuator. In particular, but not exclusively, the invention relates to an armature for use in a pump forming part of a selective catalytic reduction system.

BACKGROUND TO THE INVENTION

One strategy for reducing nitrogen oxide exhaust gas emissions in an internal combustion engine involves the introduction of a reagent comprising a reducing agent, typically a liquid ammonia source such as an aqueous urea solution, into the exhaust gas stream. This method is known as selective catalytic reduction or SCR. The reducing agent is injected into the exhaust gas upstream of an exhaust gas catalyst, known as an SCR catalyst. Nitrogen oxides in the exhaust gas undergo a catalysed reduction reaction with the ammonia source on the SCR catalyst, forming gaseous nitrogen and water.

Typically, in a selective catalytic reduction (SCR) system, injection of the reagent into the exhaust gas stream is achieved by pumping the reagent from a supply tank to an injection nozzle disposed within the exhaust gas stream using a suitable pump, such as described in the present applicant's co-pending European Patent Application Publication No. EP-A-1878920.

FIG. 1 shows, schematically and in simplified form, a known pump 20 suitable for pumping reagent in an SCR system. The pump 20 comprises a solenoid actuator 22 disposed within a generally cylindrical housing 24. The actuator 22 comprises a tubular pole member 26, formed integrally with the housing 24, and a wire winding or coil 28 disposed around the pole member 26. One end of the pole member 26 forms an annular pole face 30 of the actuator 22.

An armature 32 is provided in an armature chamber 34 adjacent to the pole face 30. The armature 32 is connected to a pumping plunger 36. The plunger 36 is slidably received in a central bore 38 of a sleeve 40 disposed centrally within the pole member 26. An end face 42 of the sleeve 40 is spaced from the pole face 30, so as to form a spring chamber 44 adjacent to the pole face 30. A biasing spring 46 is partially received in the spring chamber 44 to bias the armature 32 away from the pole face 30. One end of the biasing spring 46 abuts the end face 42 of the sleeve 40, and the other end of the biasing spring 46 abuts a central region 48 of the armature 30.

The pump 20 further comprises, at an upstream end, an inlet 50, which receives fluid from a source such as a tank (not shown) and, at a downstream end, an outlet 52 that is in communication with a delivery nozzle (not shown). In use of the pump 20 in an SCR system for an internal combustion engine, the fluid is a reagent and the delivery nozzle is disposed within an exhaust pipe of the engine.

A supply passage 54 is provided within the pump 20 to convey fluid from the inlet 50 to the outlet 52. In this example, the supply passage 54 comprises an annular space 56 between the pole member 26 and the coil 28, and further comprises radial passages 58 that extend through the pole member 26 and the sleeve 40 to communicate with the bore 38 of the sleeve 40. When the pumping plunger 36 is in the position shown in FIG. 1, with the armature 32 biased away from the pole face 30, the radial passages 58 communicate with a delivery chamber 60 formed at a downstream end of the bore 38 of the sleeve 40.

Fluid flow from the delivery chamber 60 to the outlet 52 is controlled by an outlet valve 62, which is arranged to open when the pressure of fluid in the delivery chamber 60 exceeds a threshold level.

In operation, in a pumping stroke of the pump, the coil 28 is energized to generate a toroidal magnetic field around the coil 28. As a result, the armature 32 moves towards the pole face 30, against the force of the biasing spring 46, such that the downstream end of the plunger 36 interrupts fluid flow between the radial passages 58 and the delivery chamber 60. The downstream end of the plunger 36 reduces the volume of the delivery chamber 60, so that the pressure of fluid in the delivery chamber 60 increases. Once the threshold pressure is reached, the outlet valve 62 opens to cause delivery of fluid from the outlet 52 of the pump 20.

The coil 28 is then de-energized, whereupon the magnetic forces acting on the armature 32 diminish. The force of the biasing spring 46 causes the armature 32 to move away from the pole face 30, so as to increase the volume of the pumping chamber 60 and re-open fluid communication between the radial passages 58 and the delivery chamber 60. Fluid can then re-fill the delivery chamber 60, ready for the next pumping stroke.

In an SCR system, it is desirable to provide rapid, frequent injections of fluid into the exhaust pipe. For example, to ensure sufficient atomization of the fluid as it leaves the delivery nozzle, the velocity of the pumping plunger 36 must be relatively high, typically of the order of 2 meters per second. As will be appreciated from FIG. 1, the armature 32 must move through fluid within the armature chamber 34. Since the diameter of the armature 32 is relatively large, a significant quantity of fluid is displaced when the armature 32 moves. The displacement of this fluid tends to slow the movement of the armature 32 and therefore the pumping plunger 36.

To allow the armature 32, and hence the plunger 36, to move fast enough in the armature chamber 34, it is known to provide vent holes 64 in the armature 32. The vent holes 64 extend axially through the armature 32 from the face of the armature 32 nearest the pole face 30 to the opposite face, furthest from the pole face 30. During movement of the armature 32, fluid can flow through the vent holes 64 as well as around the periphery of the armature 32, thereby reducing the fluid drag on the armature 32.

It has been found that, when the coil 28 is de-energized and the armature 32 moves away from the pole face 30, the pressure in the spring chamber 44 is caused to drop rapidly. This can lead to cavitation damage to the actuator 20, caused by the collapse of cavities in the fluid in the spring chamber 44 that form as a result of the pressure drop.

Accordingly, it would be desirable to provide an armature for an actuator that overcomes or mitigates this problem.

SUMMARY OF THE INVENTION

Against this background, the present invention resides in an armature for a solenoid actuator including a first face having a recess suitable for receiving a biasing spring in use of the armature, and a second face opposite the first face. The armature further includes means for fluid communication through the armature between the recess and the second face in use of the armature. The first face is uninterrupted by the fluid communication means.

By providing a fluid flow path between the recess and the second face, the pressure difference across the armature upon movement of the armature can be minimized. Consequently, the risk of cavitation damage is lower, particularly in the region of the recess. The armature is therefore suitable for use in an actuator that operates at high speeds and/or frequencies, such as in a pump in a selective catalytic reduction system.

Furthermore, because the first face of the armature is uninterrupted by the fluid communication means, the presence of the fluid communication means does not significantly affect the magnetic behavior of the armature when used in an actuator. In particular, the ability of the armature to carry a magnetic field in the material of the armature adjacent to the front face is not significantly reduced by the presence of the fluid communication means. To this end, the fluid communication means may be spaced from the first face of the armature.

The fluid communication means may communicate with a peripheral wall of the recess. The armature may define a central axis normal to the first face, and the fluid flow path may have a first component in a direction parallel to the axis and a second component extending radially with respect to the axis. In one embodiment, a vector described by the fluid flow path can be resolved into a first vector component parallel to the axis and a second vector component extending radially with respect to the axis. Preferably, the fluid flow path is inclined with respect to the axis. The armature may be generally cylindrical or disc-shaped, and the axis may be a cylinder axis of the armature.

In one embodiment, the fluid communication means includes one or more passages extending from the second face to the recess.

In another embodiment, the fluid communication means includes one or more channels in the second face of the armature that open into the recess. The depth of the or each channel may increase moving towards the recess. In this way, the channel may define a fluid flow path that is inclined with respect to the axis of the armature.

The or each channel may be arranged such that, during manufacture of the armature, the or each channel is formable by relative movement of a tool and the armature in a direction normal to the first face. In this case, the armature is thereby designed such that the shape of the armature allows for straightforward fabrication, for example by molding or pressing. In one example, the armature is shaped such that the entirety of the or each channel is open to the second face in the direction normal to the first face.

The fluid communication means may further include an indentation in an end face of the recess adjacent to the opening of the or each channel into the recess. The indentation may be a dimple. Advantageously, the indentation serves to increase the cross-sectional area of the fluid flow path.

The armature may further include venting means for providing a fluid flow path between the first face and the second face. In one embodiment, the fluid communication means intersects the venting means.

The armature may further include an aperture for receiving a plunger in use of the armature. The aperture preferably extends between the second face and the recess. In use, the aperture is closed by the plunger. A piston, valve element or other control member could be used in place of the plunger.

The invention also extends to a solenoid actuator including an armature according to the invention as described above. The actuator may further include a pole member having a pole face, wherein the first face of the armature is opposed to the pole face. The actuator may further include a biasing spring. A first end of the biasing spring may be received within the recess of the armature. The biasing spring may bias the armature away from the pole face.

The invention also extends to a fluid pump for a selective catalytic reduction system. The fluid pump includes an armature according the invention as described above, and/or a solenoid actuator according to the invention as described above.

The invention also resides in a fluid pump for a selective catalytic reduction system, including a solenoid actuator having an armature, a pole member having a pole face, and a biasing spring for biasing the armature away from the pole face. The armature includes a first face including a recess for receiving the biasing spring; a second face opposite the first face; and fluid communication means for providing a fluid flow path through the armature between the recess and the second face in use of the pump, the first face being uninterrupted by the fluid communication means. The pump further includes a pumping plunger associated with the armature. The solenoid actuator is operable to cause reciprocable movement of the pumping plunger.

The invention further resides in an armature for a solenoid actuator, the armature including a first face including a recess suitable for receiving a biasing spring in use of the armature, the recess having a peripheral wall; a second face opposite the first face; and at least one passage extending from the second face to the peripheral wall for providing a fluid flow path through the armature between the recess and the second face in use of the armature.

Preferred and/or optional features of each embodiment of the invention may be present in the other embodiments of the invention also, alone or in appropriate combination.

BRIEF DESCRIPTION OF THE DRAWINGS

Reference has already been made to FIG. 1 of the accompanying drawings, which is a cross-sectional view of a known fluid pump.

Embodiments of the present invention will now be described, by way of example only, with reference to the remaining accompanying drawings, in which like reference numerals are used for like parts, and in which.

DETAILED DESCRIPTION OF THE INVENTION

Figure 1:
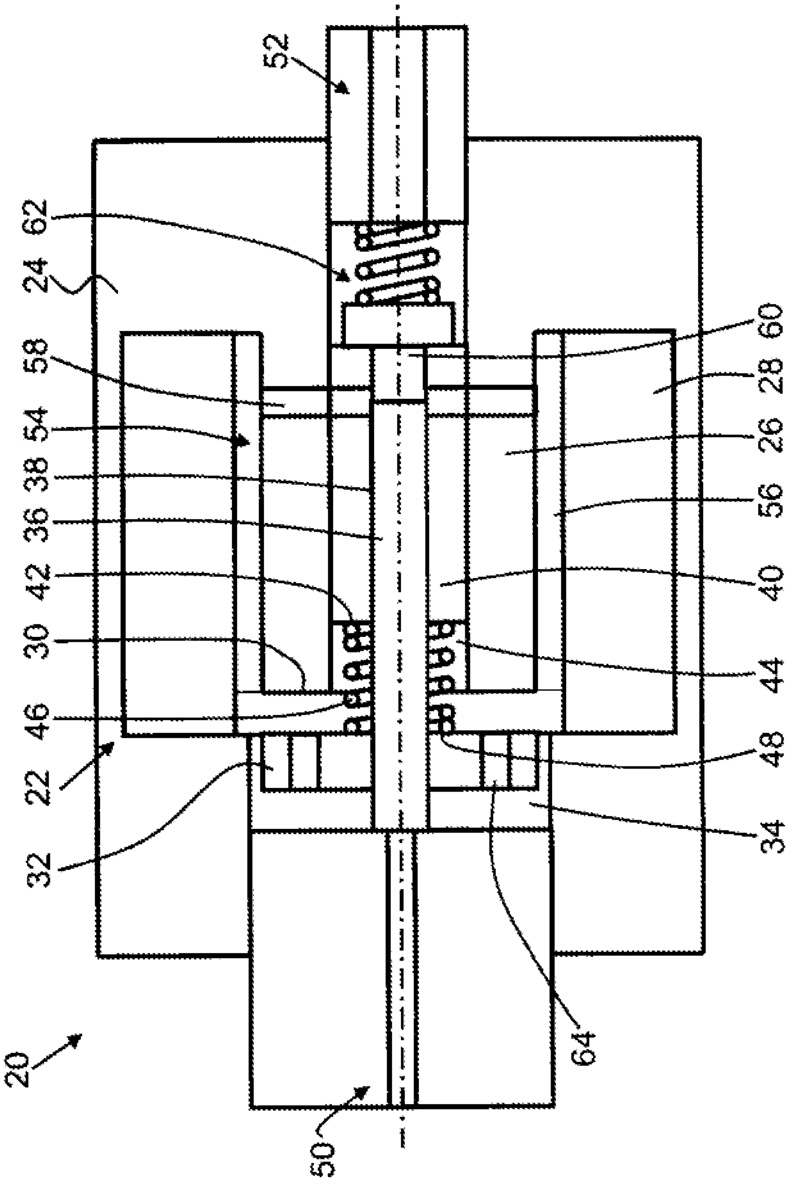
Figure 1 PRIOR ART
Figure 2:
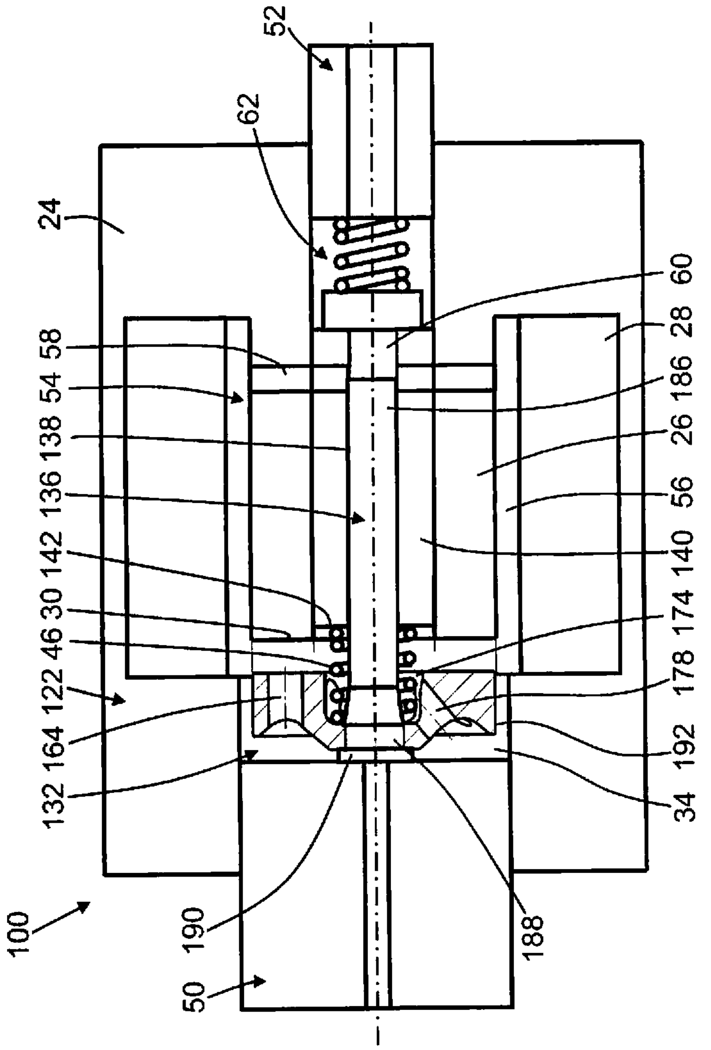
FIG. 2 is a cross-sectional view of a fluid pump having an armature according to a first embodiment of the invention.

FIG. 2 shows a fluid pump 100 suitable for pumping reagent in an SCR dosing system of an internal combustion engine. Many of the components of the pump 100 are similar to those described above with reference to the known pump 20 of FIG. 1, and like reference numerals are used for like parts. Consequently, only the differences between the invention shown in FIG. 2 and the known pump 20 of FIG. 1 will be described in detail.

Figure 3:
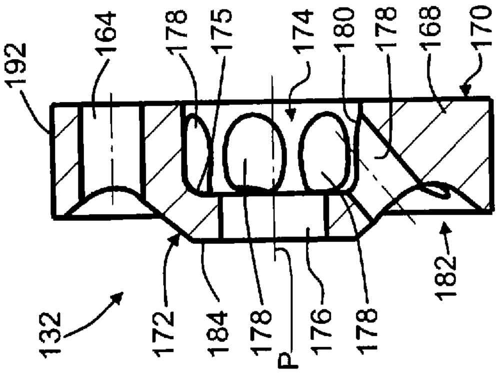
FIG. 3 is an enlarged cross-sectional view of the armature of the fluid pump shown in FIG. 2.

The pump 100 comprises an actuator 122 having an armature 132 according to a first embodiment of the invention. Referring additionally to FIG. 3, the armature 132 comprises a generally disc-shaped body 168 defining a central axis (labeled P in FIG. 3) at the diametric centre of the disc. The armature 132 is made from a suitable soft magnetic material, such as a ferritic iron alloy. The armature includes a first face 170 that opposes the pole face 30 of the actuator, and a second face 172 opposite the first face 170.

A generally cylindrical recess 174 is provided in the first face 170 of the armature 132. The recess 174 is disposed coaxially with the body 168 of the armature 132. An aperture 176 extends from the recess 174 to the second face 172.

Vent holes 164 extend through the body 168 between the first and second faces 170, 172 in a direction parallel to the armature axis P. Only one such axial vent hole 164 is visible in FIGS. 2 and 3, but preferably several axial vent holes 164 are provided, spaced equi-angularly around the armature 132.

Furthermore, several vent passages 178 extend through the body 168 from the second face 172 to the recess 174. The vent passages 178 comprise drillings disposed at an angle, or inclined, relative to the axis P of the armature 132. These inclined vent passages 178 open into a peripheral wall 180 of the recess 174. One inclined vent passage 178 is visible in cross-section in FIGS. 2 and 3, whilst only the openings into the wall 180 of three other inclined vent passages 178 are visible. Seven passages 178 in total are provided in this example.

Except for the recess 174, the first face 170 of the armature 132 is generally planar. The second face 172 comprises an annular groove or depression 182 arranged around a central land 184, through which the aperture 176 emerges. The axial vent holes 164 and the inclined vent passages 178 communicate with or intersect the groove 182.

In use, as shown in FIG. 2, the armature 132 is located in the armature chamber 34 of the pump 100. The pumping plunger 136 comprises a plunger shaft 186 and, at an upstream end thereof, a cylindrical plunger head 188 and an end plate 190. Preferably, the end plate 190 is integral with the plunger head 188. The plunger head 188 is received within the aperture 176 of the armature 132. The end plate 190 has a diameter larger than the plunger head 188, so that the end plate 190 abuts the land 184 on the second face 172 of the armature.

The plunger head 188 is a tight fit in the aperture 176, and may be a threaded or interference fit. The end plate 190 may be welded or otherwise connected to the armature 136. The plunger head 188 and the end plate 190 together block the flow of fluid through the aperture 176 in use of the pump 100.

As in the known pump of FIG. 1, the tubular pole member 26 of the pump receives a sleeve 140. The sleeve 140 comprises a central bore 138 within which the shaft 186 of the plunger 136 is slidable. An upstream end face 142 of the sleeve 140 is set back slightly from the pole face 30, in a downstream direction.

The upstream end of the spring 46 is received in the recess 174 and abuts the upstream end face 175 thereof. Thus, in this embodiment of the invention, the armature 132 comprises a spring chamber in the form of the recess 174. The downstream end of the spring 46 abuts the end face 142 of the sleeve 140.

Operation of the pump 100 is as described for the pump of FIG. 1. However, the inclined passages 178 provide fluid communication means that allow fluid to flow between the second face 172 of the armature and the recess 174 as the armature 132 reciprocates within the armature chamber 34. Advantageously, therefore, when the armature 132 approaches the pole face 30, fluid can still flow between the spring chamber defined by the recess 174 and the armature chamber 34. As a result, the pressure drop on the downstream side of the armature 132, particularly in the recess 174 and adjacent to the end face 142 of the sleeve 140, is minimized, and cavitation damage is unlikely to arise.

If the passages 178 were absent, the fluid volume in the recess 174 could become isolated from the armature chamber 34 if the armature 132 were to abut the pole face 30. This would result in a significantly higher pressure drop arising on the downstream side of the armature 132, leading to an increased risk of cavitation damage.

On energization of the coil 28, the magnetic field passes from the housing 24 into the peripheral edge 192 of the armature, then through the body of the armature 168 to its first face 170, before passing into the pole face 30 of the pole member 26.

It is to be noted that the inclined passages 178 do not intersect the first face 170 of the armature 132. Instead, the inclined passages 178 open into the recess 174, leaving the first face 170 uninterrupted by the passages 178. Similarly, the peripheral edge 192 of the armature is uninterrupted by the passages 178. Consequently, the path of the magnetic field within the armature 132 on energization of the coil 28 is largely unaffected by the presence of the inclined passages 178, and so the inclined passages 178 do not appreciably reduce the force imparted to the armature 132, even when, as is preferable, the inclined passages 178 have a relatively large diameter to provide a large flow area.

It will also be appreciated that the provision of the passages 178 advantageously reduces the mass of the armature 132. By reducing the mass of the armature 132, the inertia of the armature 132 is reduced so that the plunger 136 can move at higher speed. However, the bending stiffness of the armature 132 is not significantly reduced by the presence of the passages 178.

Furthermore, because the inclined passages 178 open into the wall 180 of the recess, the end face 175 of the recess 174 is uninterrupted by the openings of the passages 178 so as to provide a planar surface against which the spring 46 can be stably located. Likewise, the passages 178 do not encroach on the aperture 176, so that the fit of the plunger head 188 in the aperture 176 is not affected by the presence of the passages 178.

Each inclined passage 178 extends in a direction having only radial and axial components, with respect to armature axis P. As a result, the flow of fluid through the inclined passages 178 upon movement of the armature 132 does not give rise to rotational forces on the armature 132, as would be the case if the passages 178 extended in a direction having a non-radial component.

The armature 132 of FIGS. 2 and 3 could be manufactured by machining from a solid bar or rod of suitable material. The axial vent holes 164 and inclined vent passages 178 could be formed by drilling.

Figure 4:
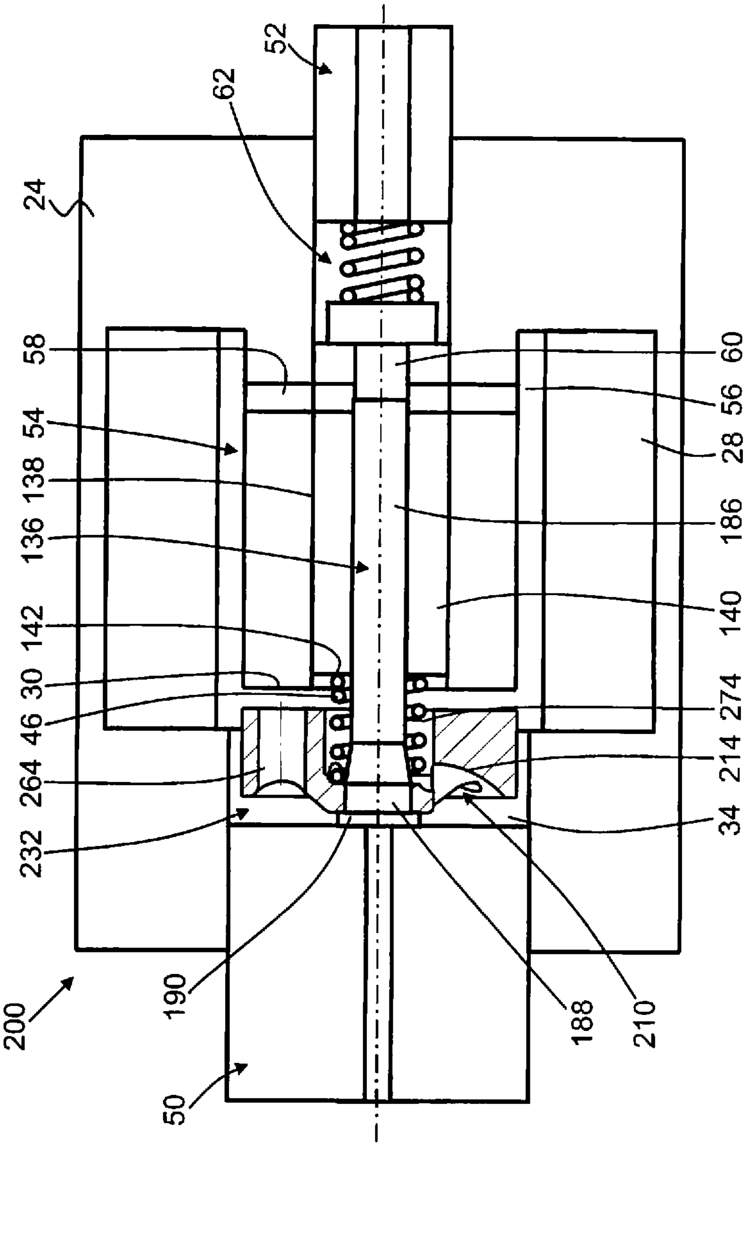
FIG. 4 is a cross-sectional view of a fluid pump having an armature according to a second embodiment of the invention.

FIG. 4 shows a pump 200 having an armature 232 according to a second embodiment of the invention. The pump 200 of FIG. 4 differs from the pump 100 of FIG. 2 only in the design of the armature 232, and like reference numerals are used for like parts. Only the differences between the first and second embodiments will be described.

Figure 5:
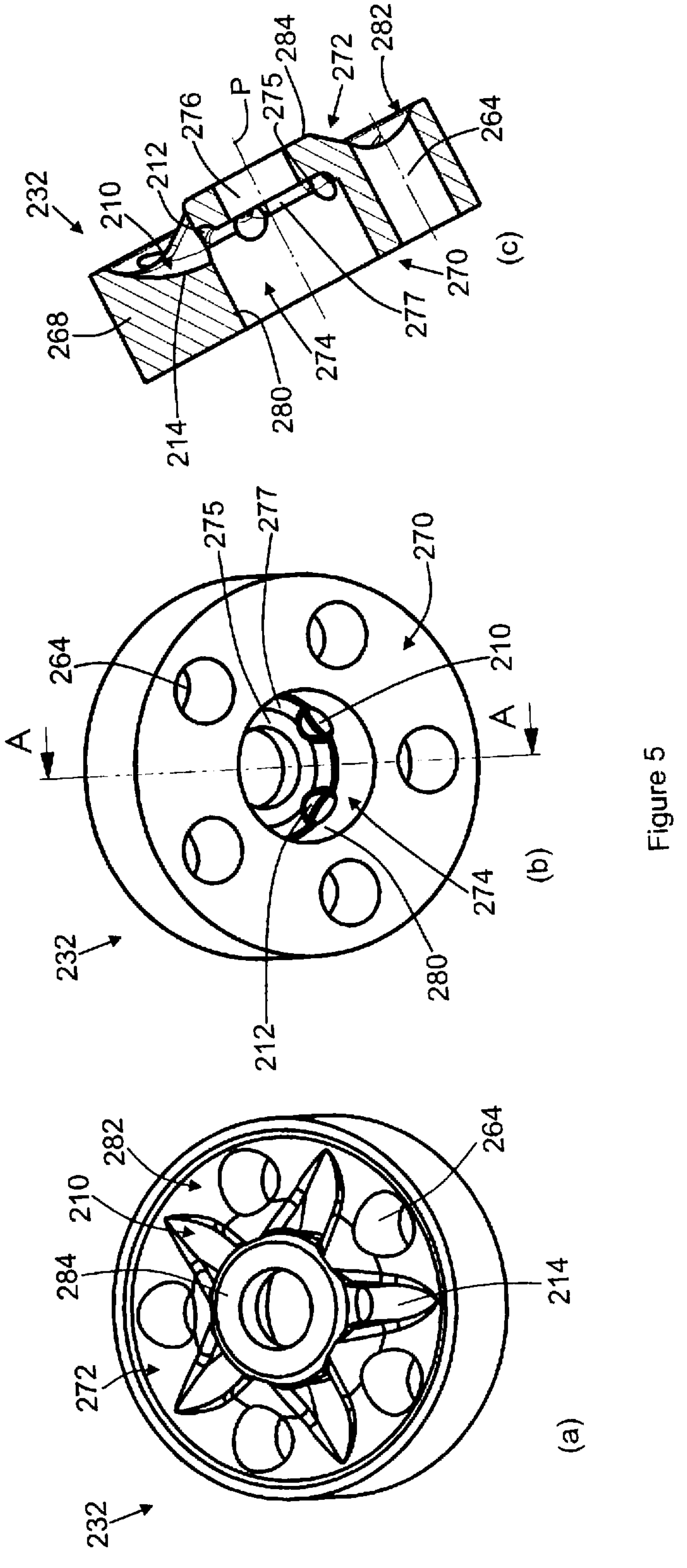
FIG. 5 illustrates the armature of the fluid pump in FIG. 4 in greater detail, showing (a) a perspective view of one face of the armature; (b) a perspective view of another, opposite face of the armature; and (c) a cross-sectional view on line A-A of the armature.

As shown additionally in FIG. 5, in this second embodiment the armature 232 comprises a body 268, a first face 270 opposed to the pole face 30 of the actuator 54 in use, and a second face 272 opposite the first face 270.

A recess 274 is provided in the first face 270 to receive the upstream end of the spring 46. In this embodiment of the invention, a chamfered region 277 of the recess 274 connects the end face 275 and the peripheral wall 280 of the recess. The spring 46 abuts the generally planar end face 275 of the recess 274.

As in the first embodiment of the invention, the second face 272 of the armature 232 comprises an annular groove 282 disposed around a central land 284. An aperture 276 extends from the recess 274 to the second face 272. In use, the plunger 136 is received in the aperture 276 so as to prevent fluid flow through the aperture 276.

The armature 232 comprises five axial vent holes 264, arranged equi-angularly around the armature 232 and extending through the armature 232 in a direction parallel to the armature axis P. Each of the vent holes 264 communicates with the groove 282, and allows fluid communication between the first and second faces 270, 272 of the armature 232.

The armature 232 further comprises five radially-extending grooves or channels 210 in the second face 272. The channels 210 are generally U-shaped in cross section, and the depth of each channel 210 increases moving towards the centre of the armature 232 so that a base 214 of each channel 210 extends at an inclined angle with respect to the axis P of the armature 232. Each channel 210 intersects or opens into the peripheral wall 280 of the recess 274, downstream of the central land 284, so that the channels 210 define fluid communication means that allow fluid to flow between the second face 272 and the recess 274 in use of the armature.

As seen most clearly in FIGS. 5(*b*) and (*c*), where each channel 210 meets the wall 280 of the recess 274, the chamfered region 277 is absent so as to allow fluid flow between the recess 274 and the channels 210. Furthermore, in order to increase the flow area through the channels 210, the intersection between each channel 210 and the recess 274 is enlarged by the provision of an indentation or dimple 212 in the end face 275 of the recess 274. The intersection between each channel 210 and the recess 274 is therefore generally circular.

The channels 210 in this second embodiment of the invention serve the same purpose as the inclined passages 178 in the first embodiment of the invention, and share the same advantages.

Additionally, it is to be noted that the shape of the channels 210 in the second embodiment is such that the entirety of each channel 210 is open to the second face 272 of the armature 232 in the axial direction. In other words, every part of each channel 210 is in view when looking at the second face 272 of the armature 232 along the axis P. Similarly, the entirety of each dimple 212 is open to the first face 270 of the armature 232. Consequently, during manufacture of the armature 232, the channels 210 and the dimples 212 are respectively formable by relative movement of a tool and the armature 232 in a direction parallel to the armature axis P.

The armature 232 can therefore be manufactured readily by metal injection molding, without the need for retractable pins to form inclined channels, or by a pressing and sintering process, in which only axial movement of the punches and dies is possible.

Figure 6:
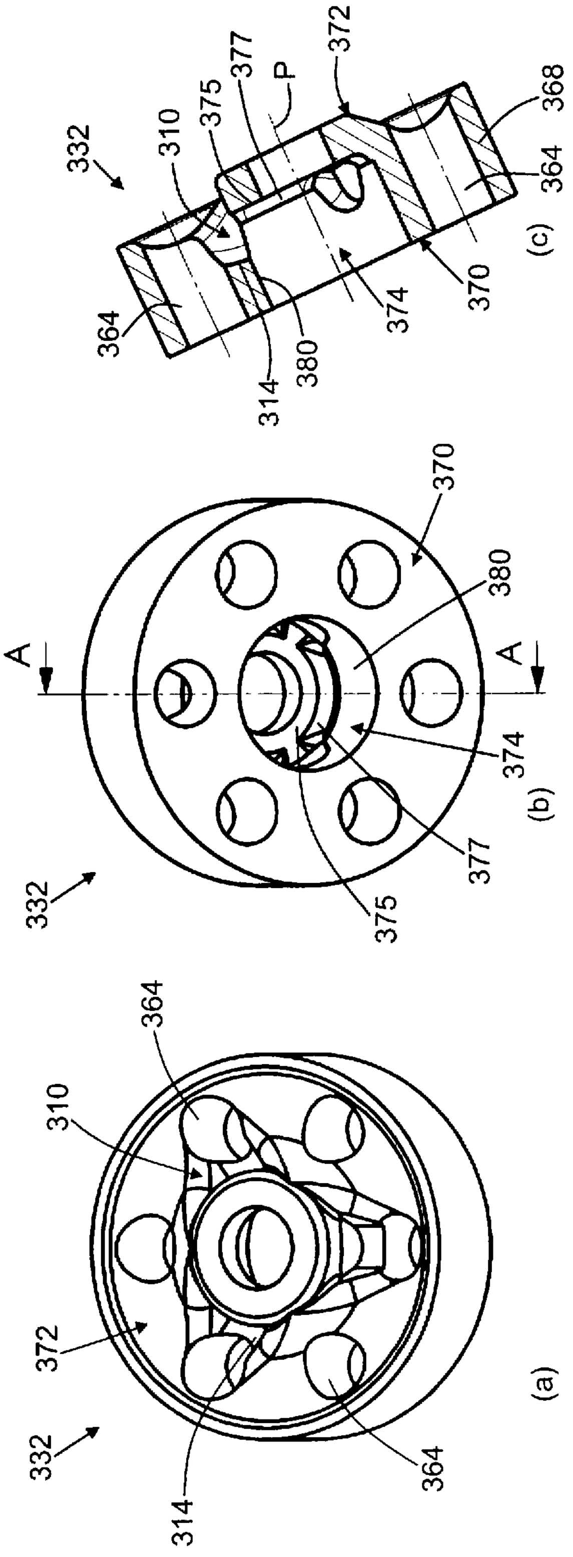
FIG. 6 illustrates an armature according to a third embodiment of the invention, showing (a) a perspective view of one face of the armature; (b) a perspective view of another, opposite face of the armature; and (c) a cross-sectional view on line A-A of the armature.

FIG. 6 illustrates an armature 332 according to a third embodiment of the invention. The armature 332 is similar to the armature of the second embodiment illustrated in FIG. 5. Only the differences between the third and second embodiments will be described.

In this third embodiment of the invention, three channels 310 are provided in the second face 272 of the armature 332, to provide fluid communication means between the second face 272 and the recess 374 in the first face 370 of the armature 332. Additionally, six axial vent holes 364 are provided to allow fluid communication between the first and second faces 370, 372.

The channels 310 intersect three of the axial vent holes 364. The channels 310 can therefore extend deeper into the body 368 of the armature 332, so that the area of intersection between each channel 310 and the peripheral wall 380 of the recess 374 is larger than in the armature shown in FIGS. 4 and 5. The base 314 of each channel, which leads from the periphery of an axial vent hole 364 to the wall 380 of the recess, extends at an inclined angle with respect to the axis of the armature 332.

The chamfered region 377 between the end face 375 and the peripheral wall 380 of the recess 374 is absent in the region of the intersection between each channel 310 and the recess 374, so as to increase the flow area. However, because the channels 310 extend further towards the first face 370 of the armature 332, it is not necessary to provide dimples in the end face 375 of the recess 374 in this embodiment.

It will be appreciated that any suitable means for fluid communication between the recess and the second face of the armature may be provided, so long as the fluid communication means does not interrupt, intersect or extend along or into the first face of the armature. Examples of such means include drillings, bores, passages, channels, grooves, notches, conduits, indentations, depressions and so on. The form of the fluid communication means may be selected based on the preferred manufacturing method for the armature.

Any suitable number of fluid communication means could be provided in the armature. For example, between three and seven passages, channels or other such means may be provided. Similarly, any suitable number of axial vent holes may be provided. Providing more passages advantageously increases the total cross-sectional area available for fluid communication through the armature. Preferably, the axial vent holes and the fluid communication means are uniformly distributed around the armature, but this need not be the case.

The fluid communication means may intersect one or more of the axial vent holes, as in the third embodiment of the invention, or alternatively the fluid communication means may be separate from the axial vent holes. Conceivably, the axial vent holes could be omitted, since adequate fluid flow through the armature may be available via the fluid communication means.

Several further modifications and variations to the embodiments of the invention described above are also possible, without departing from the scope of the invention as defined in the appended claims.

The invention claimed is:

1. An armature for a solenoid actuator, the armature including:

a first face including a recess for receiving a biasing spring during use of the armature;

a second face opposite the first face;

a fluid flow path through the armature between the recess and the second face during use of the armature;

a vent hole extending from an opening defined in the first face to an opening defined in the second face; and an aperture for receiving a plunger during use of the armature;

wherein the aperture extends between the second face and the recess; and wherein the first face is uninterrupted by the fluid flow path.

2. The armature of claim 1, wherein the fluid flow path communicates with a peripheral wall of the recess.

3. The armature of claim 1, wherein the armature defines a central axis normal to the first face, and wherein the fluid flow path has a first component in a direction parallel to the axis and a second component extending radially with respect to the axis.

4. The armature of claim 3, wherein the fluid flow path is inclined with respect to the axis.

5. The armature of claim 1, wherein the fluid flow path includes one or more passages extending from the second face to the recess.

6. The armature of claim 1, wherein the fluid flow path includes one or more channels in the second face of the armature that open into the recess.

7. The armature of claim 6, wherein a depth of each channel increases moving towards the recess.

8. The armature of claim 6, wherein each channel is arranged such that, during manufacture of the armature, the or each channel is formable by movement of a tool relative to armature in a direction normal to the first face.

9. The armature of claim 6, wherein the fluid flow path includes an indentation in an end face of the recess adjacent to the opening of each channel into the recess.

10. The armature of claim 1, wherein the fluid flow path intersects the vent hole.

11. A solenoid actuator including the armature according to claim 1, and a pole member having a pole face, wherein the first face of the armature is opposed to the pole face.

12. A solenoid actuator according to claim 11, and including the biasing spring, wherein a first end of the biasing spring is received within the recess of the armature.

13. A fluid pump for a selective catalytic reduction system, including the solenoid actuator according to claim 11.

14. A fluid pump for a selective catalytic reduction system, including an armature according to claim 1.

15. A fluid pump for a selective catalytic reduction system, including a solenoid actuator having an armature, a pole member having a pole face, and a biasing spring for biasing the armature away from the pole face; the armature including:

a first face including a recess for receiving the biasing spring;

a second face opposite the first face;

a vent hole extending from an opening defined in the first face to an opening defined in the second face; and a fluid flow path through the armature between the recess and the second face during use of the pump, the first face being uninterrupted by the fluid flow path;

the pump further including a pumping plunger associated with the armature; the solenoid actuator being operable to cause reciprocable movement of the pumping plunger.

16. An armature for a solenoid actuator, the armature including:

a first face including a recess for receiving a biasing spring during use of the armature, the recess having a peripheral wall;

a second face opposite the first face;

a vent hole extending from an opening defined in the first face to an opening defined in the second face;

at least one passage extending from the second face to the peripheral wall for providing a fluid flow path through the armature between the recess and the second face during use of the armature; and an aperture for receiving a pumping plunger during use of the armature.

* * * * *